United States Patent [19]
Rosson

[11] Patent Number: 5,263,106
[45] Date of Patent: Nov. 16, 1993

[54] FIBER OPTIC ATTENUATOR FOR USE WITH FERRULES

[75] Inventor: Joel C. Rosson, Hickory, N.C.

[73] Assignee: Siecor Corporation, Hickory, N.C.

[21] Appl. No.: 899,530

[22] Filed: Jun. 16, 1992

[51] Int. Cl.⁵ .............................................. G02B 6/26
[52] U.S. Cl. ...................................... 385/72; 385/60; 385/140
[58] Field of Search ............................ 385/60, 72, 140

[56] References Cited

U.S. PATENT DOCUMENTS

| | | | |
|---|---|---|---|
| 3,936,143 | 2/1976 | Sato | 385/140 X |
| 4,557,556 | 12/1985 | Decker, Jr. | 385/140 |
| 4,714,317 | 12/1987 | Szentesi | 385/140 |
| 5,050,956 | 9/1991 | Carpenter et al. | 385/140 |
| 5,082,345 | 1/1992 | Cammons et al. | 385/140 X |

FOREIGN PATENT DOCUMENTS 0175007  9/1985  Japan ................................. 385/140

OTHER PUBLICATIONS

Chipman, John D., "Fiber Optic Connectors,", pp. 45-56 (Mar. 1981).

Primary Examiner—John D. Lee
Assistant Examiner—Hemang Sanghavi
Attorney, Agent, or Firm—J. David Abernethy

[57] ABSTRACT

Disclosed is a fiber optic attenuator for holding two fiber optic ferrules such that the longitudinal axes of the ferrules are laterally offset by a predetermined distance. The attenuator housing is compatible with standard fiber optic connectors.

1 Claim, 2 Drawing Sheets

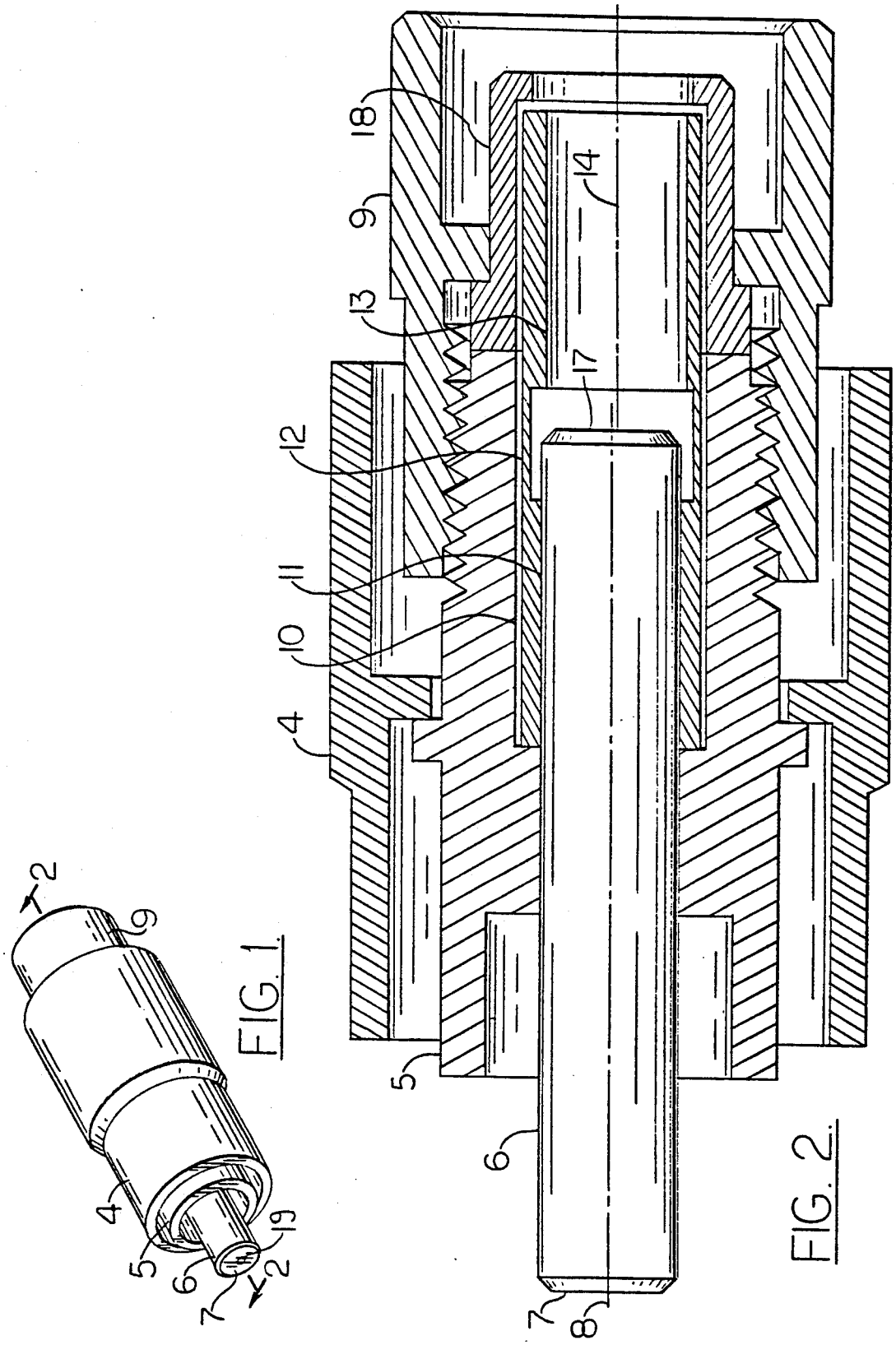

FIBER OPTIC ATTENUATOR FOR USE WITH FERRULES

BACKGROUND OF THE INVENTION

The present invention relates to apparatus for attenuating light passing between optical fibers housed in ferrules. The present invention is more compact than those which vary the longitudinal distance between ferrules, and is much easier to manufacture than attenuators which employ two different optical fibers within the same ferrule.

Optical fiber attenuators may be used to simulate attenuation losses over long distances or to reduce energy levels in a network between a transmitter and a receiver. To be accepted, an attenuator must be compatible with standard fiber optic connectors.

The prior art discloses different ways to induce attenuation. Some types of connectors leave a lengthwise gap between two ferrules holding the optical fibers. However, the resulting gap inevitably increases the length of the attenuator. Since space is at a premium in crowded splice cabinets, the increased length has a cost in decreased ease of handling.

Another type of fiber optic connector using ferrules employs a lateral displacement within a ferrule of two separate optical fibers. Such ferrules, however, are more difficult to manufacture than standard ferrules.

Therefore, what is required is an attenuator for optical fibers housed in ferrules which is compatible with standard fiber optic connectors, as compact as possible, and posing no unusual manufacturing problems.

SUMMARY OF THE INVENTION

Disclosed is an improved fiber optic attenuator for inducing attenuation of light passing between optical fibers mounted in elongated ferrules. An elongated fiber optic connector housing is used which is compatible with a standard fiber optic connector. The specification and drawings specifically relate to an FC connector housing, but other standard type housings may be substituted as a matter of preference. The housing has a bore therein holding a first elongated, generally cylindrical ferrule having a distal end protruding from the connector housing and a proximal end housed within the bore. The first ferrule has frustrums at both its distal and its proximal ends. The first ferrule concentrically holds along its longitudinal axis a straight first optical fiber therein which is longitudinally coextensive with the first ferrule.

The housing also is designed to receive a second elongated, generally cylindrical ferrule within the housing such that the end of the second ferrule abuts the proximal end of the first ferrule such that the longitudinal axes of the first and second ferrules are parallel to each other but are laterally offset by a predetermined distance.

This alignment may be accomplished by holding the first and second ferrules within a bore delimited by the inner wall of the connector housing itself, with a first inner wall delimiting a first bore section holding the first ferrule having a longitudinal axis slightly offset from the longitudinal axis of a second bore section delimited by a second inner wall. Alternatively, misalignment may be produced by an attenuator sleeve which has first and second sleeve sections which have slightly offset longitudinal axes so that the first and second ferrules held by the first and sleeve sections will be laterally offset by a predetermined distance.

BRIEF DESCRIPTION OF THE DRAWINGS

The specification refers to the several drawings, in which:

FIG. 1 is a perspective view of the attenuator;

FIG. 2 is a sectional view of the attenuator along line 2—2 of FIG. 1; and,

DETAILED DESCRIPTION OF THE PREFERRED EMBODIMENT

Figure 3:
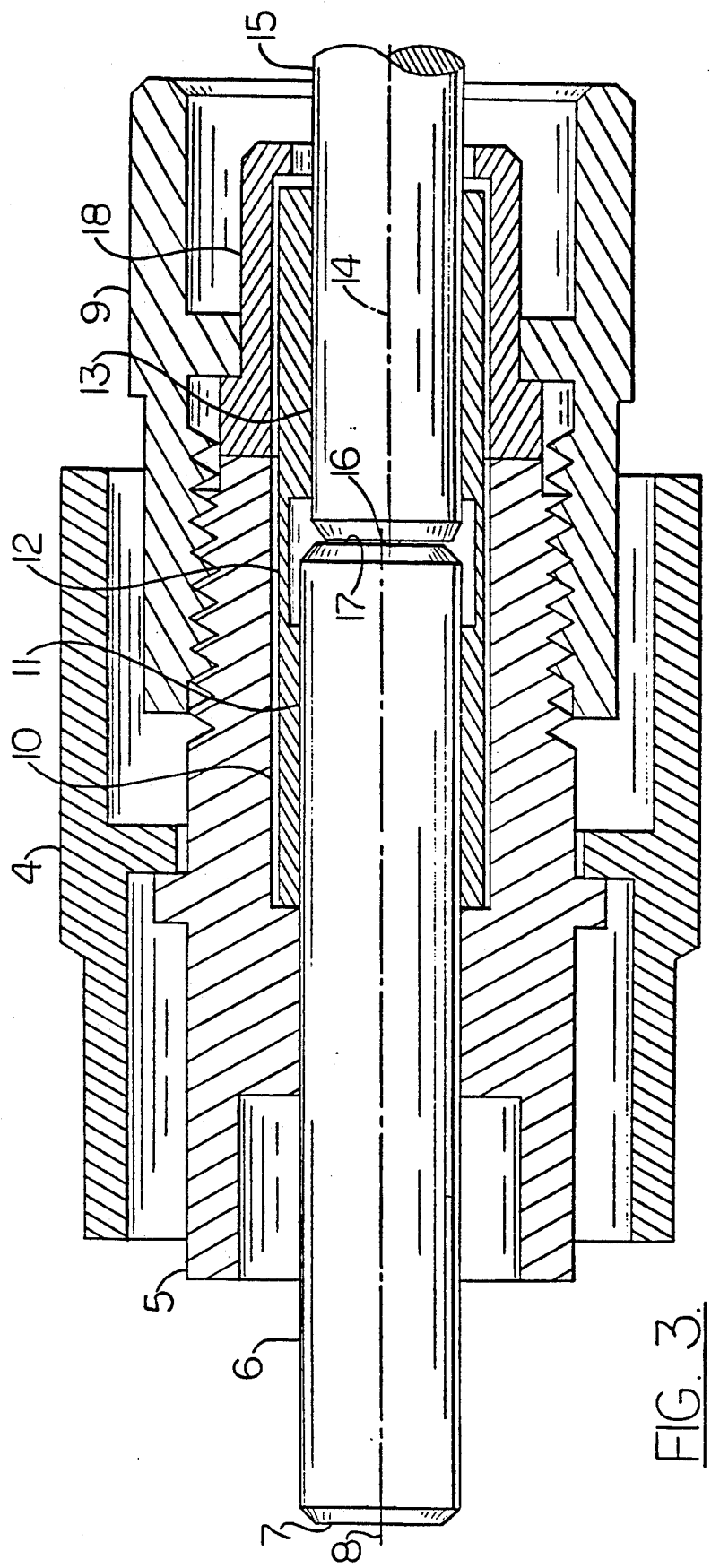
FIG. 3 is a sectional view of the attenuator similar to that of FIG. 2 except that a second ferrule is shown as inserted in the attenuator.

Referring generally to FIGS. 1, 2, and 3, the outward profile of the attenuator is that of a standard fiber optic connector; in this case, a type of connector popularly known as an FC connector. Thus, the composition and shapes of coupling nut 4, shroud 5, threaded adapter 9, and sleeve guide 18 all are designed to be compatible with or identical to the equivalent components of existing FC connectors. Shroud 5 and sleeve guide 18 form a housing having an inner surface 10 delimiting a bore. Coupling nut 4, shroud 5, adapter 9, and sleeve guide 18 are all composed of plastic and are joined by an epoxy with the exception of the threaded connection of shroud 5 and adapter 9.

Shroud 5 holds a first elongated, generally cylindrical ferrule 6 having a distal end 7 protruding from the housing and a proximal end 17 within the bore, each end having frustrums thereon. A first straight optical fiber 19 is concentric with longitudinal axis 8 of ferrule 6, and first optical fiber 19 extends throughout the length of ferrule 6.

To achieve the desired lateral offset of longitudinal axis 8 of first elongated, generally cylindrical ferrule 6 and longitudinal axis 14 of the second elongated, generally cylindrical ferrule 15, an adapter sleeve 12 is inserted within a bore formed by interior surface 10 of shroud 5 and sleeve guide 18. Sleeve 12 has a first sleeve section having a first inner wall 11 whose longitudinal axis is coincident with that of longitudinal axis 8 of ferrule 6. Inner wall 13 of the second sleeve section, however, has a longitudinal axis 14 which is parallel to but laterally offset a predetermined distance from longitudinal axis 8. Thus, although end 16 of ferrule 15 abuts end 17 of ferrule 6, an induced attenuation results which is given by the formula power loss equals $$P_{ldl} = -10 \log \left[ 1 - \left(\frac{2}{\pi}\right)\left(\frac{L}{D}\right)\left(1 - \frac{L^2}{D^2}\right)^{\frac{1}{2}} - \frac{2}{\pi}\sin^{-1}\left(\frac{L}{D}\right) \right]$$

where L is the lateral displacement between longitudinal axis 14 and longitudinal axis 8, and D is the core diameter of optical fibers held by ferrules 6 and 14.

In an alternative embodiment of the invention, sleeve 12 would be integrally formed with and a part of shroud 5, such that ferrules 6 and 15 would be held within first and second interior sections of shroud 5 itself instead of first and second sections of attenuation sleeve 12.

What is claimed is:

1. Apparatus for inducing attenuation of light passing between optical fibers mounted in elongated ferrules, comprising:

an elongated fiber optic connector housing having a sleeve therein, the sleeve having first and second sections, the first sleeve section holding a first elongated, generally cylindrical ferrule, the first ferrule having frustrums at both of its ends, the first ferrule concentrically holding a straight first optical fiber therein which is longitudinally coextensive with the first ferrule, and the second sleeve section adapted to receive therein a second elongated, generally cylindrical ferrule such that an end of the second ferrule may abut the proximal end of the first ferrule, the first sleeve section and the second sleeve section having longitudinal axes which are parallel to each other but laterally offset by a predetermined distance.

* * * * *